(12) United States Patent
Lee et al.

(10) Patent No.: US 7,573,546 B2
(45) Date of Patent: Aug. 11, 2009

(54) WIRE GRID POLARIZER HAVING DUAL LAYER STRUCTURE AND METHOD OF FABRICATING THE SAME

(75) Inventors: Su-mi Lee, Hwaseong-si (KR); Moo-gyu Lee, Suwon-si (KR); Yoon-sun Choi, Incheon (KR); Guk-hyun Kim, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 94 days.

(21) Appl. No.: 11/934,219

(22) Filed: Nov. 2, 2007

(65) Prior Publication Data

US 2008/0252799 A1 Oct. 16, 2008

(30) Foreign Application Priority Data

Apr. 10, 2007 (KR) ...................... 10-2007-0035177

(51) Int. Cl.
*G02F 1/1335* (2006.01)

(52) U.S. Cl. ........................................................ 349/96

(58) Field of Classification Search .................... 349/96
See application file for complete search history.

(56) References Cited

U.S. PATENT DOCUMENTS 7,480,017 B2 * 1/2009 Fisher et al. .................. 349/96

* cited by examiner

*Primary Examiner*—David Nelms
*Assistant Examiner*—Phu Vu
(74) *Attorney, Agent, or Firm*—Sughrue Mion, PLLC (57) ABSTRACT

Provided are a wire grid polarizer having a double layer structure, with two metallic wire layers, and a method of fabricating the same. The wire grid polarizer having a double layer structure includes: a light transmitting substrate; a plurality of first conductive metallic wires arranged on the light transmitting substrate parallel to one another at a predetermined period; a light transmitting interlayer arranged on the first conductive metallic wires; and a plurality of second conductive metallic wires arranged on the light transmitting substrate parallel to one another at a predetermined period, wherein the first conductive metallic wires and the second conductive metallic wires are arranged alternately.

24 Claims, 10 Drawing Sheets

WIRE GRID POLARIZER HAVING DUAL LAYER STRUCTURE AND METHOD OF FABRICATING THE SAME

CROSS-REFERENCE TO RELATED PATENT APPLICATIONS

This application claims priority from Korean Patent Application No. 10-2007-0035177, filed on Apr. 10, 2007, in the Korean Intellectual Property Office, the disclosure of which incorporated herein in its entirety by reference.

BACKGROUND OF THE INVENTION

1. Field of the Invention

Apparatuses and methods consistent with the present invention relate to a wire grid polarizer and a method of fabricating the same, and more particularly, to a wire grid polarizer having a double layer structure in which two metallic wire layers have a two-layer shape, and a method of fabricating the same.

2. Description of the Related Art

Image forming apparatuses which require an additional light source, such as a liquid crystal display (LCD) or a beam projector, use a polarizer to form an image by variably transmitting or blocking light. However, since conventional polarizers are mainly absorptive polarizers, only half of the light emitted from a light source is used, and the other half is absorbed by the polarizer. Thus, the light use efficiency is low and the brightness is limited.

Figure 1A:
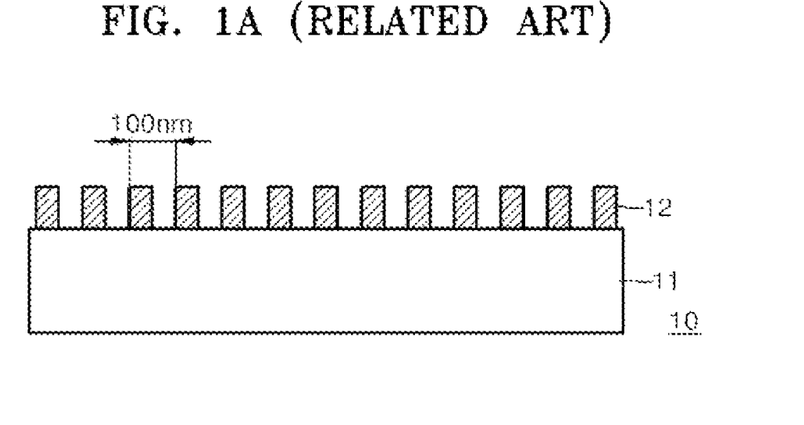
FIGS. 1A and 1B are a cross-sectional view and a plan view of a conventional wire grid polarizer.
Figure 1B:
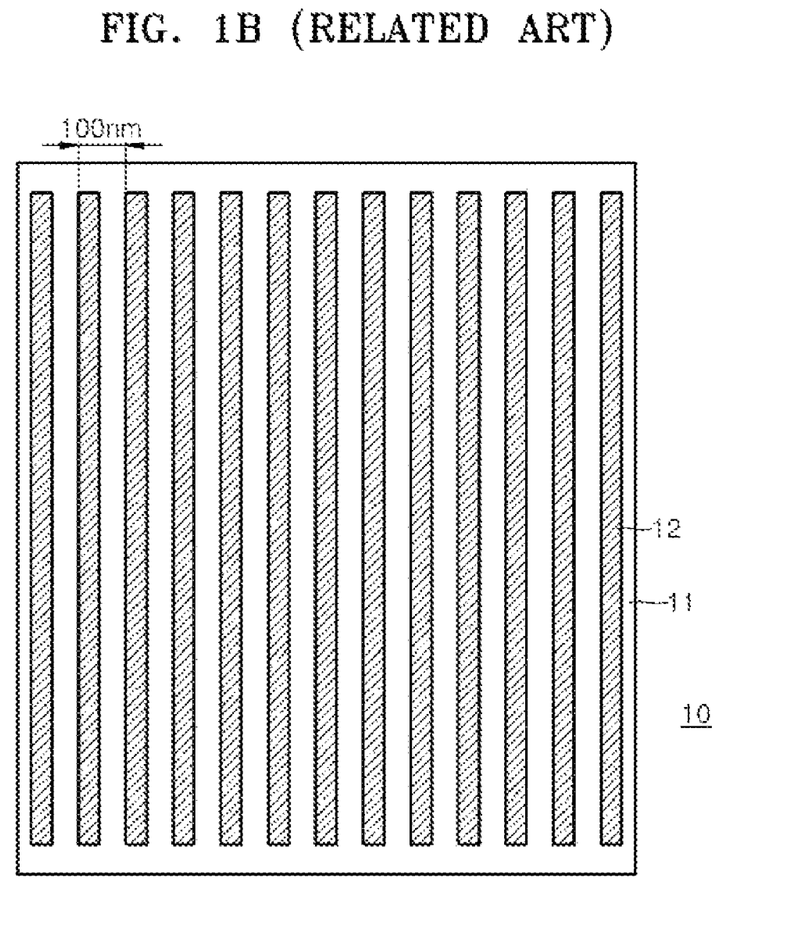

To avoid these problems, reflective polarizers have been suggested. Reflective polarizers reflect rather than absorb the unused light. An example of a reflective polarizer is a wire grid polarizer. FIGS. 1A and 1B are a cross-sectional view and a plan view, respectively, of a wire grid polarizer 10. As illustrated in FIGS. 1A and 1B, the wire grid polarizer 10 includes a plurality of conductive metallic wires 12 arranged in parallel on a transparent substrate 11 at a regular period. When the period of the metallic wires 12 is similar to or larger than the wavelength of an incident electromagnetic wave, traditional diffraction occurs. However, when the period of the metallic wires 12 is much smaller than the wavelength of the incident electromagnetic wave, diffraction does not occur. In this case, light polarized parallel to the metallic wires 12 (S-polarized light) is reflected, and light polarized perpendicular to the metallic wires 12 (P-polarized light) is transmitted. The width, thickness, and period of the metallic wires 12 determine the polarization characteristics of the wire grid polarizer 10, such as its transmissivity and reflectivity.

However, in order to allow the wire grid polarizer 10 to operate over the entire region of visible rays without loss, the period of the metallic wires 12 must be less than about 100 nm. Such a short period can only be achieved by technology such as laser lithography, electron beam lithography, or nano imprinting, as used in semiconductor fabrication. However, although such technology has been used to develop and produce a wire grid polarizer, the minimum period has been about 150 nm. Furthermore, no technology exists for mass producing a large-scale wire grid polarizer for an image forming apparatus.

SUMMARY OF THE INVENTION

Exemplary embodiments of the present invention provide a wire grid polarizer which can be easily fabricated compared to the related art, and a method of fabricating the same.

Exemplary embodiments of the present invention also provide a wire grid polarizer having a double layer structure which is suitable for use in a visible ray region.

Exemplary embodiments of the present invention also provide a liquid crystal display (LCD) and a projector using a wire grid polarizer having a double layer structure.

According to an aspect of the present invention, there is provided a wire grid polarizer having a double layer structure, comprising: a light transmitting substrate; a plurality of first conductive metallic wires arranged on the light transmitting substrate parallel to one another at a first predetermined period; a light transmitting interlayer arranged on the plurality of first conductive metallic wires; and a plurality of second conductive metallic wires arranged on the light transmitting interlayer parallel to one another at a second predetermined period, wherein the first conductive metallic wires of the plurality of first conductive metallic wires and the second conductive metallic wires of the plurality of second conductive metallic wires are arranged alternately.

The thickness d of the light transmitting interlayer may satisfy the Equation: $nd=m\lambda/2$, where n is a refractive index of the light transmitting interlayer, $\lambda$ is the wavelength of incident light, and m is a natural number.

The width of each of the first and second conductive metallic wires of the pluralities of the first and the second conductive metallic wires may be selected in such a way that a fill factor thereof is about 0.15 to 0.35.

The thickness of the light transmitting interlayer may be about 150±50 nm, the period of each of the first and second conductive metallic wires of the pluralities of the first and the second conductive metallic wires may be about 200 nm, and a fill factor of each of the first and second conductive metallic wires of the pluralities of the first and the second conductive metallic wires may be about 0.25.

The area between the first conductive metallic wires of the plurality of first conductive metallic wires or the area between the second conductive metallic wires of the plurality of second conductive metallic wires may be filled with a light transmitting material.

According to another aspect of the present invention, there is provided an LCD (liquid crystal display) comprising: a backlight unit having a reflection plate installed at a lower portion of the backlight unit; a liquid crystal panel displaying an image; and a wire grid polarizer having a double layer structure arranged between the backlight unit and the liquid crystal panel; wherein the wire grid polarizer having a double layer structure comprises: a light transmitting substrate; a plurality of first conductive metallic wires arranged on the light transmitting substrate parallel to one another at a first predetermined period; a light transmitting interlayer arranged on the plurality of first conductive metallic wires; and a plurality of second conductive metallic wires arranged on the light transmitting substrate parallel to one another at a second predetermined period, wherein the first conductive metallic wires of the plurality of first conductive metallic wires and the second conductive metallic wires of the plurality of second conductive metallic wires are arranged alternately.

According to another aspect of the present invention, there is provided a projector comprising: a light source; a liquid crystal panel modulating light from the light source; and a wire grid polarizer having a double layer structure arranged on a light incident side of the liquid crystal panel; a projection optical system projecting light from the liquid crystal panel; and a reflector arranged in the rear of the light source and reflecting light toward the liquid crystal panel, wherein the wire grid polarizer having a double layer structure comprises: a light transmitting substrate; a plurality of first conductive metallic wires arranged on the light transmitting substrate parallel to one another at a first predetermined period; a light transmitting interlayer arranged on the plurality of first conductive metallic wires; and a plurality of second conductive metallic wires arranged on the light transmitting substrate parallel to one another at a second predetermined period, wherein the first conductive metallic wires of the plurality of first conductive metallic wires and the second conductive metallic wires of the plurality of second conductive metallic wires are arranged alternately.

According to another aspect of the present invention, there is provided a method of fabricating a wire grid polarizer having a double layer structure, the method comprising: forming a first conductive metallic layer on a light transmitting substrate; forming a plurality of first conductive metallic wires parallel to one another at a first predetermined period by etching the first conductive metallic layer; forming a light transmitting interlayer on the plurality of first conductive metallic wires; forming a second conductive metallic layer on the light transmitting interlayer; and forming a plurality of second conductive metallic wires parallel to one another at a second predetermined period by etching the second conductive metallic layer, wherein the first conductive metallic wires of the plurality of first conductive metallic wires and the second conductive metallic wires of the plurality of second conductive metallic wires are arranged alternately.

According to another aspect of the present invention, there is provided a method of fabricating a wire grid polarizer having a double layer structure, the method comprising: forming a first conductive metallic layer on a light transmitting substrate; forming a plurality of first conductive metallic wires parallel to one another at a first predetermined period by etching the first conductive metallic layer forming a release layer of a hydrophobic material on the second substrate; forming an interlayer of a light transmitting material on the release layer; forming a second conductive metallic layer on the interlayer; forming a plurality of second conductive metallic wires parallel to one another at a second predetermined period by etching the second conductive metallic layer; and separating the interlayer from the release layer and joining the interlayer to the plurality of first conductive metallic wires.

BRIEF DESCRIPTION OF THE DRAWINGS

The above and other exemplary aspects of the present invention will become more apparent by the following detailed description of exemplary embodiments thereof with reference to the attached drawings in which.

DETAILED DESCRIPTION OF EXEMPLARY EMBODIMENTS OF THE INVENTION

Figure 2:
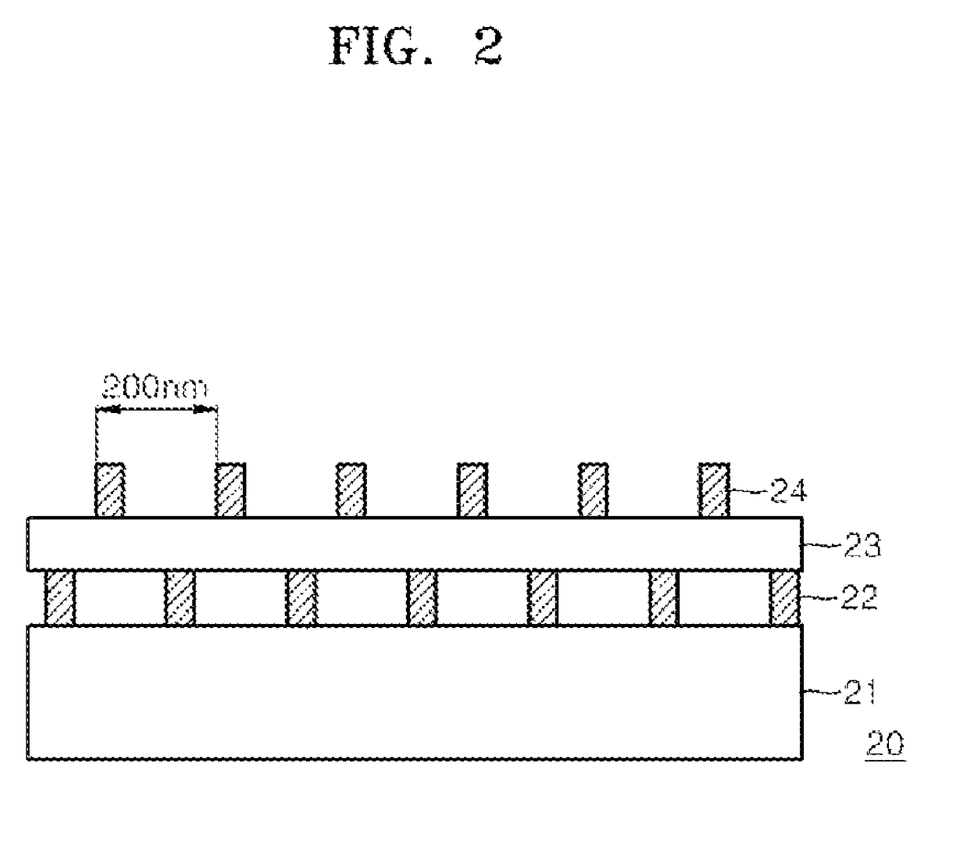
FIG. 2 is a schematic cross-sectional view of a wire grid polarizer having a double layer structure according to an exemplary embodiment of the present invention.

FIG. 2 is a schematic cross-sectional view of a wire grid polarizer 20 having a double layer structure according to an exemplary embodiment of the present invention. Referring to FIG. 2, the wire grid polarizer 20 having a double layer structure according to an exemplary embodiment of the present invention comprises a transparent substrate 21 which transmits visible rays, a plurality of first conductive metallic wires 22 arranged on the transparent substrate 21, an interlayer 23 arranged on the plurality of first conductive metallic wires 22, and a plurality of second conductive metallic wires 24 arranged on the interlayer 23.

The plurality of first conductive metallic wires 22 are arranged in parallel at a first predetermined period, and the plurality of second conductive metallic wires 24 are also arranged in parallel, at a second predetermined period. In addition, the plurality of first conductive metallic wires 22 are parallel to the plurality of second conductive metallic wires 24. In this case, as illustrated in FIG. 2, the first conductive metallic wires of the plurality of first conductive metallic wires 22 and the second conductive metallic wires of the plurality of second conductive metallic wires 24 may be arranged alternately. For example, the second conductive metallic wires of the plurality of second conductive metallic wires 24 may be positioned above the spaces between the first conductive metallic wires of plurality of first conductive metallic wires 22. The pluralities of the first and the second conductive metallic wires 22 and 24 may be formed of a typical conductive metal, for example aluminum.

The conventional wire grid polarizer 10 illustrated in FIGS. 1A and 1B has optimum polarization characteristics when the fill factor of the metallic wires 12 is about 0.3 to 0.7. The fill factor is the ratio of the widths of the metallic wires 12 to the period of the metallic wires 12. However, in the wire grid polarizer 20 according to exemplary embodiments of the present invention, since the first and second conductive metallic wires of the pluralities of the first and the second conductive metallic wires 22 and 24 are formed alternately in a double layer, the fill factor of each of the pluralities of the first and the second conductive metallic wires 22 and 24 must be half that of the related art, i.e. about 0.15 to 0.35. Then, the overall fill factor of the pluralities of the first and second conductive metallic wires 22 and 24 is about 0.3 to 0.7.

In addition, the interlayer 23 is formed of a transparent material which transmits visible rays. Thus, the interlayer 23 may be formed of the same material as the substrate 21. For example, glass or transparent plastic may be used to form the substrate 21 and the interlayer 23.

In the wire grid polarizer 20 having a double layer structure illustrated in FIG. 2 according to exemplary embodiments, since the first conductive metallic wires of the plurality of first conductive metallic wires 22 and the second conductive metallic wires of the plurality of second conductive metallic wires 24 are arranged alternately, the optical effect is similar to that if the pluralities of the first and the second conductive metallic wires 22 and 24 were arranged in the same layer. Thus, the wire grid polarizer 20 having a double layer structure can obtain the characteristics of a polarizer, even though the period of each of the pluralities of the first and the second conductive metallic wires 22 and 24 is wider than in the related art. For example, in the conventional wire grid polarizer 10 illustrated in FIGS. 1A and 1B, the period of the conductive metallic wire 12 must be less than about 100 nm. However, in the wire grid polarizer 20 according to the exemplary embodiments, the period of each of the pluralities of the first and the second conductive metallic wires 22 and 24 can be about 200 nm. Thus, the wire grid polarizer 20 can be more easily fabricated than that of the related art.

In order to allow the plurality of first conductive metallic wires 22 and the plurality of second conductive metallic wires 24 to have the same optical effect as if they were in the same layer, the thickness of the interlayer 23 must be adequate. When the thickness of the interlayer 23 is greater than adequate, the plurality of the first conductive metallic wires 22 and the plurality of the second conductive metallic wires 24 may operate independently, producing the effect of two separate overlapping wire grid polarizers each having metallic wires in a single layer at a period of about 200 nm. In addition, since Fabry-Perot interference occurs when light passes through the interlayer 23, the optical performance of the wire grid polarizer 20 is very sensitive to small changes in the thickness of the interlayer 23. Thus, the thickness of the interlayer 23 at which the wire grid polarizer 20 has an optimum optical performance may be determined.

Figure 3:
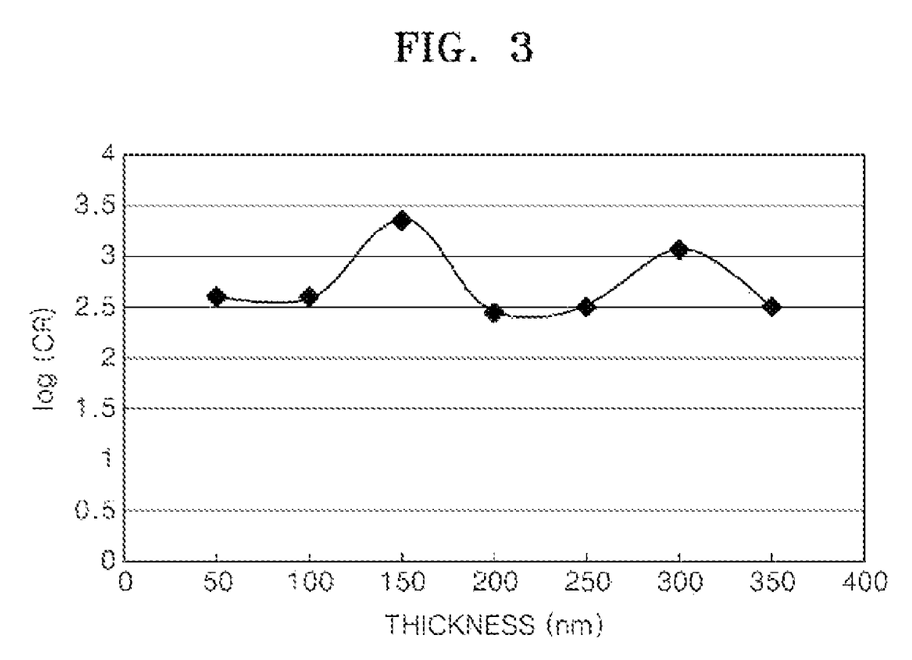
FIGS. 3 and 4 are graphs of contrast ratio and throughput of a wire grid polarizer having a double layer structure at wavelength of 460 nm according to an exemplary embodiment of the present invention.
Figure 4:
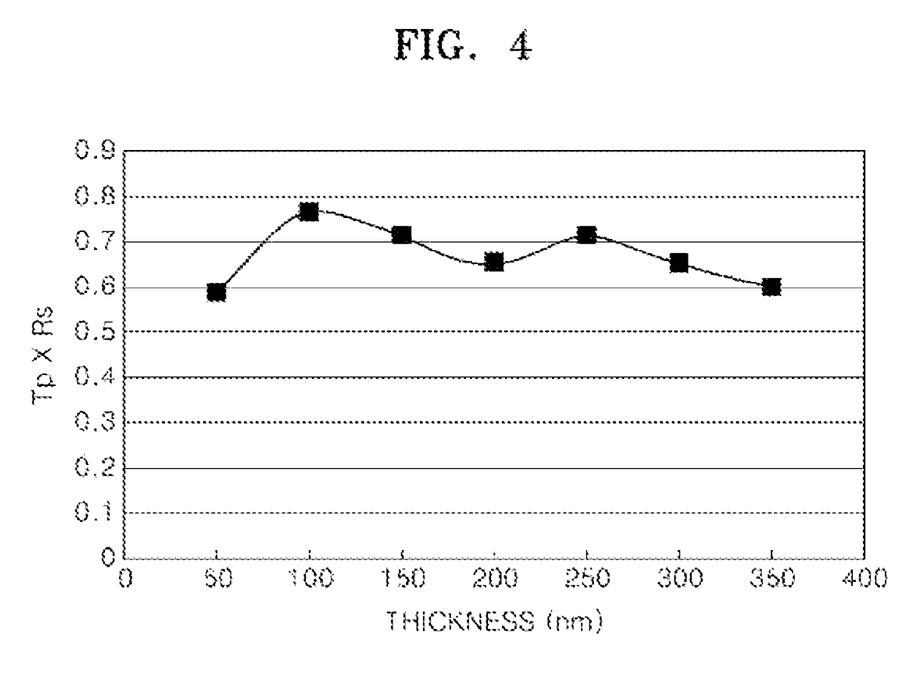
Figure 5:
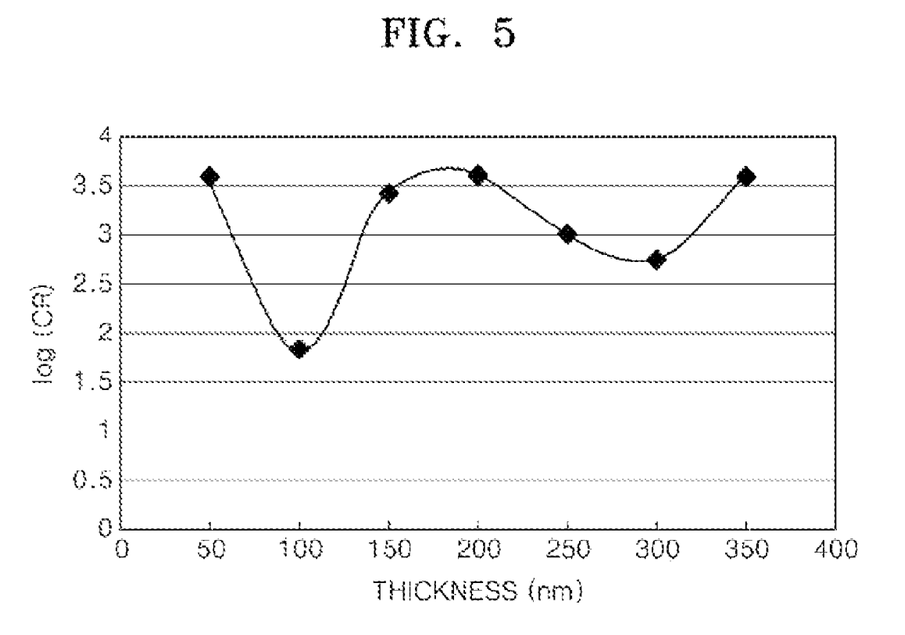
FIGS. 5 and 6 are graphs of contrast ratio and throughput of a wire grid polarizer having a double layer structure at wavelength of 540 nm according to an exemplary embodiment of the present invention.
Figure 6:
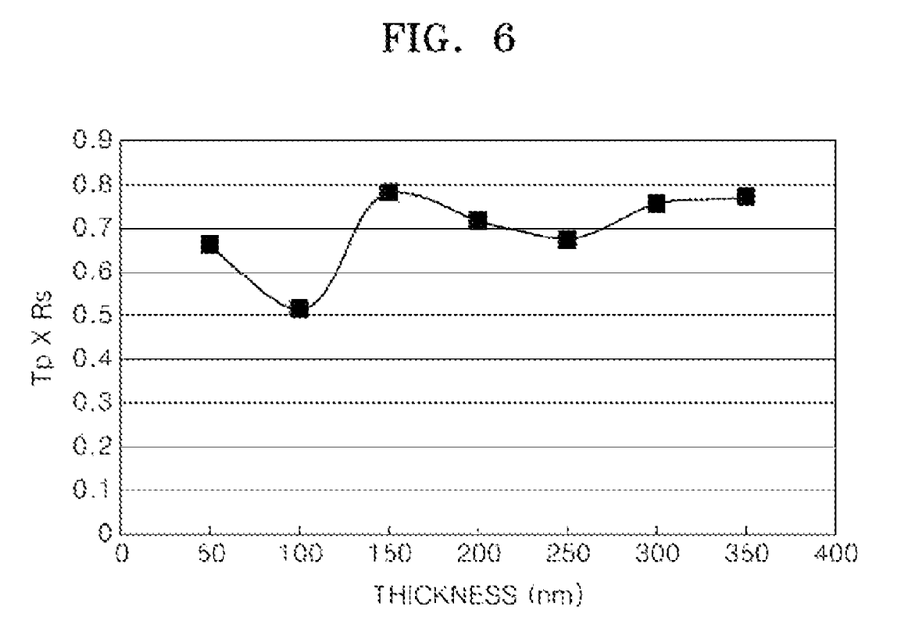
Figure 7:
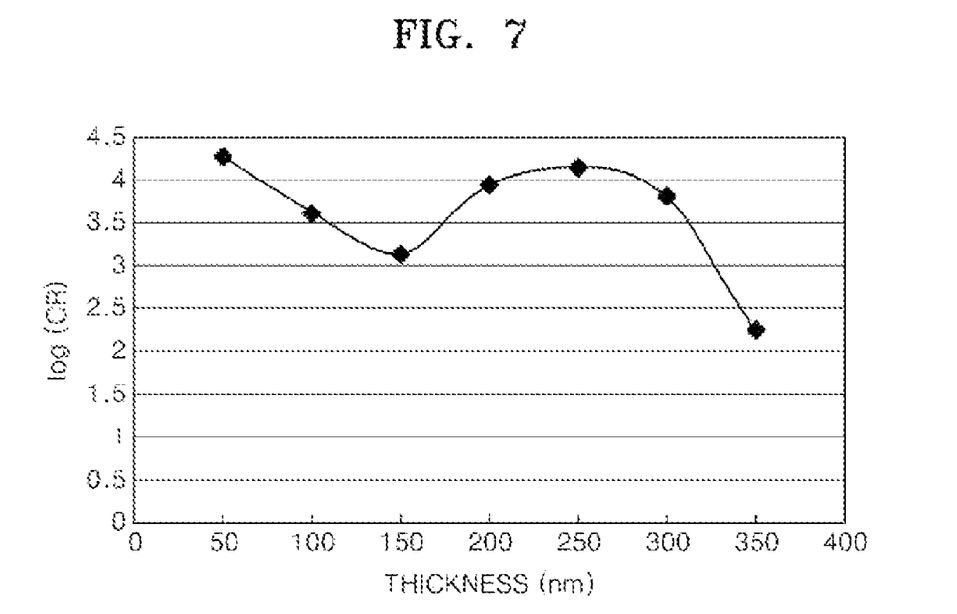
FIGS. 7 and 8 are graphs of contrast ratio and throughput of a wire grid polarizer having a double layer structure at wavelength of 650 nm according to an exemplary embodiment of the present invention.
Figure 8:
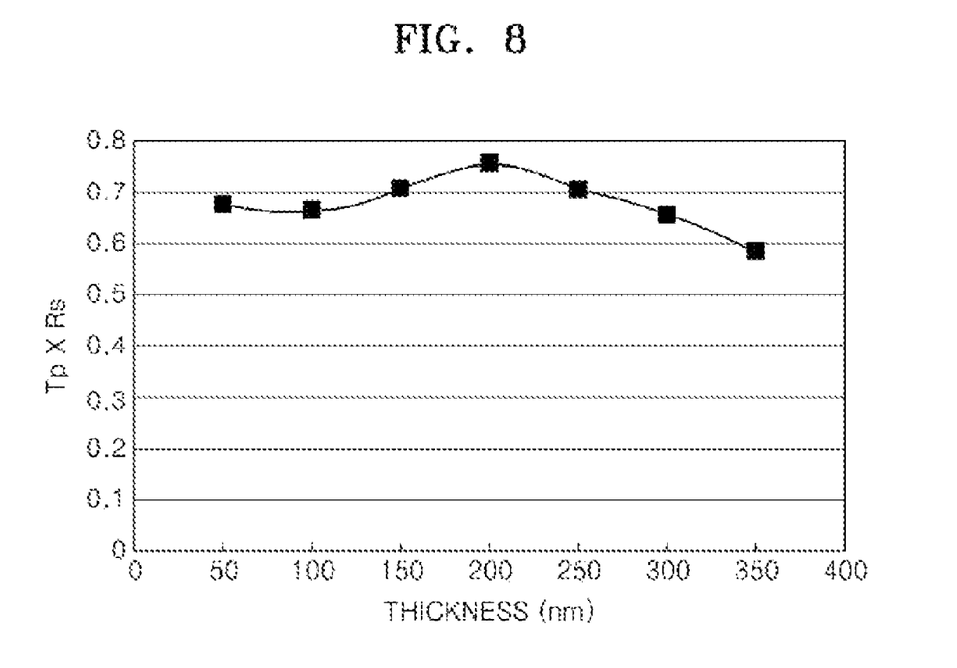

FIGS. 3 through 8 show the results of measuring the optical performance of the wire grid polarizer 20 according to an exemplary embodiment of the present invention by changing the thickness of the interlayer 23 so as to find an optimum thickness of the interlayer 23. FIGS. 3 and 4 are graphs of contrast ratio (CR) and throughput of the wire grid polarizer 20 having a double layer structure at wavelength of 460 nm. The contrast ratio (CR) is the ratio Tp/Ts of the transmissivity Tp of the wire grid polarizer 20 with respect to p-polarized light to the transmissivity Ts of the wire grid polarizer 20 with respect to s-polarized light. Log values of CR are indicated in FIG. 3. In addition, throughput is the product of the reflectivity Rs of the wire grid polarizer 20 with respect to s-polarized light and the transmissivity Tp of the wire grid polarizer 20 with respect to p-polarized light. FIGS. 5 and 6 are graphs of contrast ratio and throughput of the wire grid polarizer 20 having a double layer structure at wavelength of 540 nm according to an exemplary embodiment, and FIGS. 7 and 8 are graphs of contrast ratio and throughput of the wire grid polarizer 20 having a double layer structure at wavelength of 650 nm according to and exemplary embodiment.

The graphs of FIGS. 3 through 8 show the results of simulation using a rigorous coupled-wave analysis (RCWA) for the case where the pluralities of the first and the second conductive metallic wires 22 and 24 are formed of aluminum, the fill factor of each of the pluralities of the first and the second conductive metallic wires 22 and 24 is 0.25, the height of each of the pluralities of the first and second conductive metallic wires 22 and 24 is 150 nm, the period of each of pluralities of the the first and the second conductive metallic wires 22 and 24 is 200 nm, and the refractive index of each of the substrate 21 and the interlayer 23 is substantially about 1.5.

As shown by the graphs of FIGS. 3 through 8, the wire grid polarizer 20 according to an exemplary embodiment may provide a CR of 1000:1 or more and a throughput of 70% or more, when the thickness of the interlayer 23 is about 150±50 nm. Thus, the thickness of the interlayer 23 is about 150±50 nm on the above-described condition, and the optimum thickness of the interlayer 23 may be changed within the above range according to the wavelength of incident light. In addition, the graphs of FIGS. 3 through 8 show that the CR and throughput of the wire grid polarizer 20 according to an exemplary embodiment change periodically according to a change in the thickness of the interlayer 23. This change is caused by the Fabry-Perot interference. The thickness of the interlayer 23 for obtaining maximum performance is given by Equation 1, when considering the Fabry-Perot interference effect.

$$nd = m\lambda/2 \qquad (1)$$

Here, d is the thickness of the interlayer 23, n is the refractive index of the interlayer 23, $\lambda$ is the wavelength of incident light, and m is a natural number. As described above, when the thickness of the interlayer 23 is too great, the plurality of first conductive metallic wires 22 and the plurality of second conductive metallic wires 24 perform separate optical operations, and thus m=1 is most appropriate.

A method of fabricating the wire grid polarizer 20 having a double layer structure according to an exemplary embodiment of the present invention will now be described in detail.

FIGS. 9A through 9H illustrate a method of fabricating the wire grid polarizer 20 having a double layer structure according to an exemplary embodiment of the present invention. First, referring to FIG. 9A, a first conductive metallic layer 30 formed of a material such as aluminum is deposited on a light transmitting substrate 21 formed of a material such as glass. The deposition thickness depends on the intended thicknesses of first conductive metallic wires that will be formed later. The first conductive metallic layer 30 may be deposited to a thickness of about 150 nm, for example.

Figure 9A:
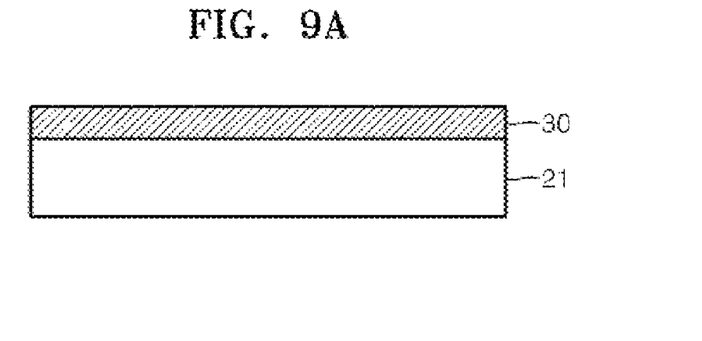
FIGS. 9A through 9H illustrate a method of fabricating a wire grid polarizer having a double layer structure according to an exemplary embodiment of the present invention.
Figure 9B:
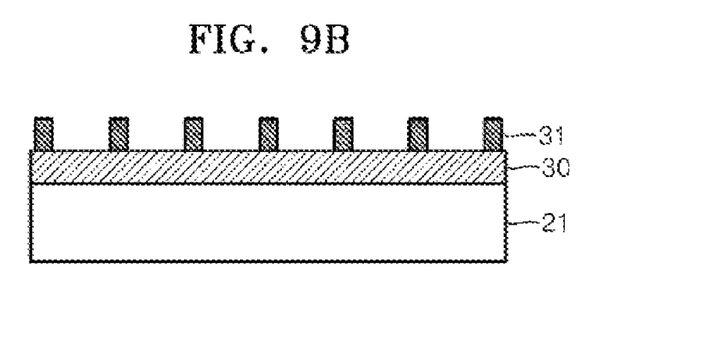
Figure 9C:
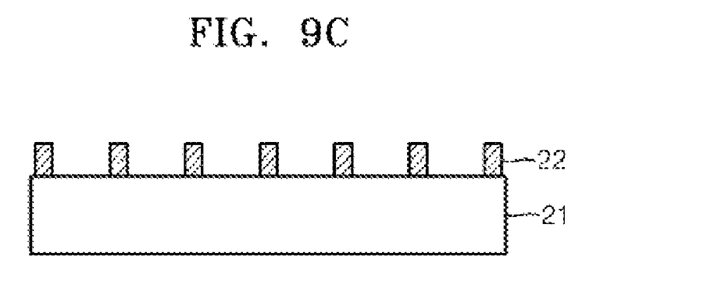

Next, referring to FIG. 9B, a first grid pattern 31 arranged in parallel at a first predetermined period is transferred onto the first conductive metallic layer 30. Alternatively, the first grid pattern may be a plurality of grid patterns. The first grid pattern 31 has the same pattern as the plurality of first conductive metallic wires 22 that will be formed later. For example, the period of the first grid pattern 31 may be about 200 nm. The first grid pattern 31 may be formed using a nano imprint method such as a step & repeat method, a roll-to-roll method, a thermal transfer method, or a UV-transfer method. After that, the first conductive metallic layer 30 is etched using the first grid pattern 31 as a mask, until the light transmitting substrate 21 is exposed. When the remaining first grid pattern 31 is removed, the plurality of first conductive metallic wires 22 are left on the substrate 21, as illustrated in FIG. 9C.

Figure 9D:
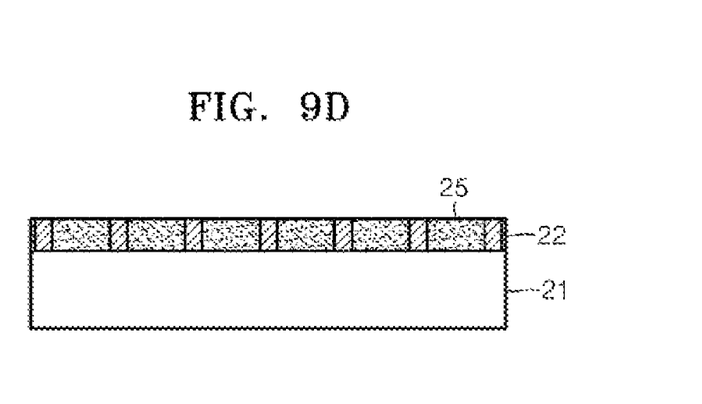

If an interlayer was formed directly on the plurality of first conductive metallic wires 22, the plurality of first conductive metallic wires 22 could be damaged and the interlayer might not be flat. Thus, in order to protect the plurality of first conductive metallic wires 22 and allow a flat interlayer, a light transmitting dielectric material 25 may be disposed between the first conductive metallic wires of the plurality of first conductive metallic wires 22 and planarized, as illustrated in FIG. 9D.

Figure 9E:
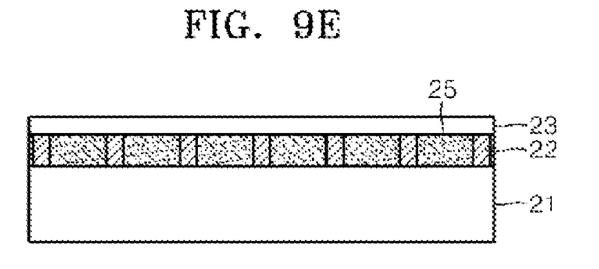

After that, as illustrated in FIG. 9E, the interlayer 23 is formed on the plurality of first conductive metallic wires 22 and the light transmitting dielectric material 25. The interlayer 23 may be easily formed using a method such as spin coating. In this case, the thickness of the interlayer 23 should be optimum as described above. For example, the interlayer 23 may be formed by spin coating to a thickness of about 150 nm.

Figure 9F:
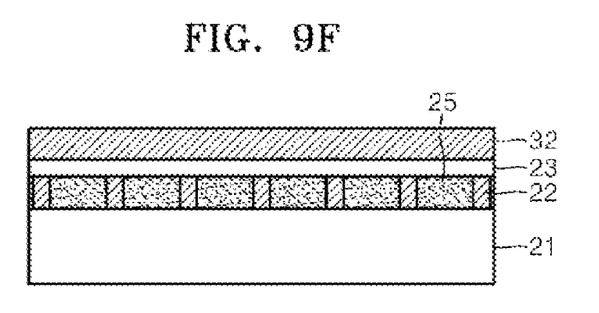
Figure 9G:
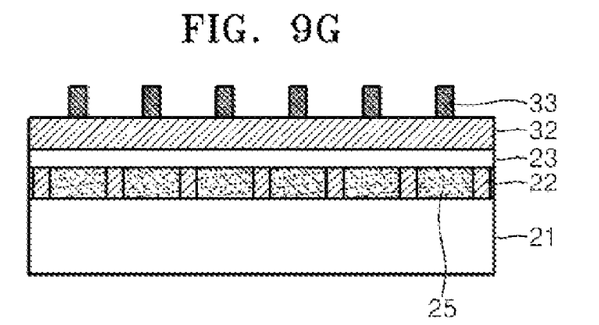

One or more second conductive metallic layers 32 formed of aluminum, for example, are deposited on the interlayer 23, as illustrated in FIG. 9F. The deposition thickness depends on the intended thicknesses of the plurality of second conductive metallic wires 24 that will be formed later. The second conductive metallic layers 32 may be deposited to a thickness of about 150 nm, for example. After that, referring to FIG. 9G, a second grid pattern 33 arranged in parallel at a predetermined period is transferred onto the second conductive metallic layer 32. Alternatively, the first grid pattern may be a plurality of grid patterns. The second grid pattern 33 has the same pattern as the plurality of second conductive metallic wires 24 that will be formed later. For example, the second grid pattern 33 may have a period of about 200 nm and may be positioned between the first conductive metallic wires of the plurality of first conductive metallic wires. The second grid pattern 33 may be formed using a nano imprint method such as a step & repeat method, a roll-to-roll method, a thermal transfer method, or a UV-transfer method.

Figure 9H:
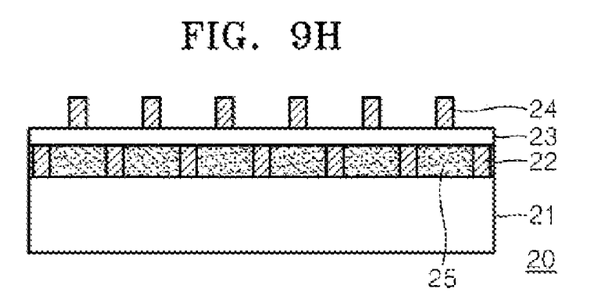

Lastly, the second conductive metallic layer 32 is etched using the second grid pattern 33 as a mask until the interlayer 23 is exposed. Then, the remaining second grid pattern 33 is removed, to complete the wire grid polarizer 20 having a double layer structure according to the present invention, as illustrated in FIG. 9H. Although not shown, a light transmitting dielectric material may also be filled between the second conductive metallic wires of the plurality of second conductive metallic wires 24 to protect the second conductive metallic wires of the plurality of second conductive metallic wires 24, like for the first conductive metallic wires of the plurality of first conductive metallic wires 22.

FIGS. 10A through 10E illustrate a method of fabricating the wire grid polarizer 20 having a double layer structure according to another exemplary embodiment of the present invention.

Figure 10A:
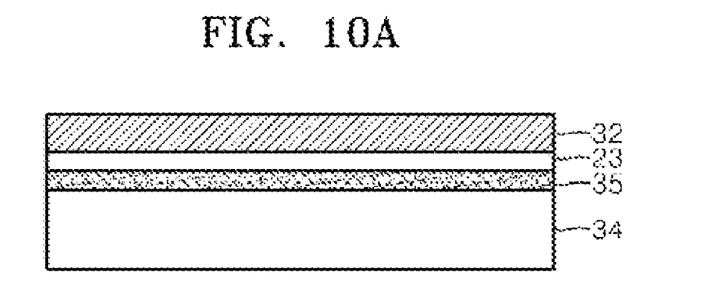
FIGS. 10A through 10E illustrate a method of fabricating a wire grid polarizer having a double layer structure according to another exemplary embodiment of the present invention.

First, through the operations illustrated in FIGS. 9A through 9D, the plurality of first conductive metallic wires 22 is formed on the substrate 21. After that, as illustrated in FIG. 10A, a release layer 35, an interlayer 23, and a second conductive metallic layer 32 are sequentially stacked on a second substrate 34. Here, the release layer 35 may be formed of a hydrophobic material so that it can be easily separated from the interlayer 23. The interlayer 23 is formed by spin coating a light transmitting material, as described above.

Figure 10B:
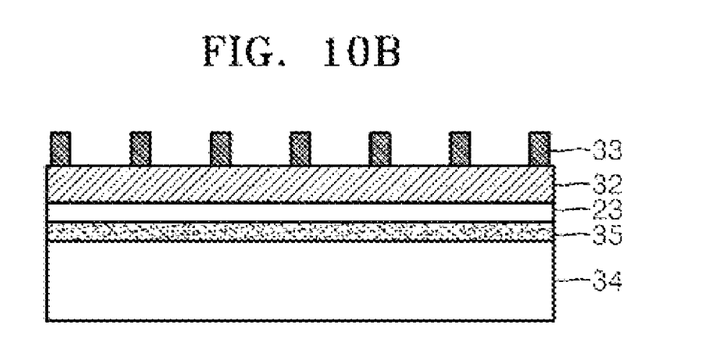
Figure 10C:
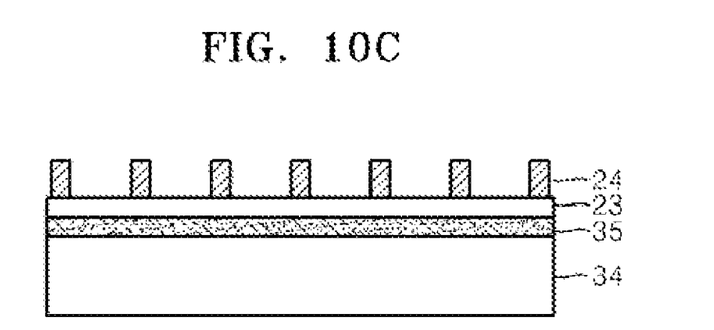
Figure 10D:
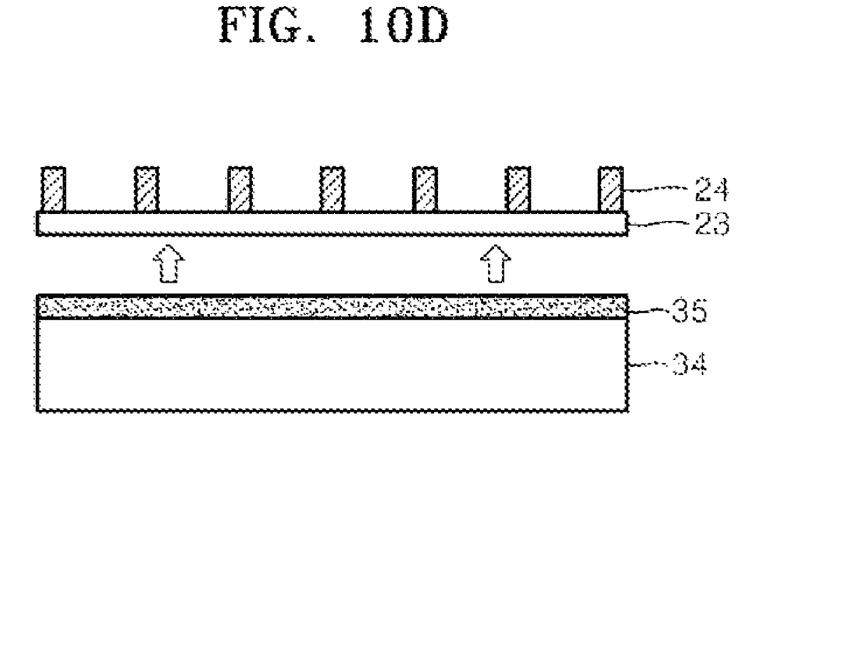
Figure 10E:
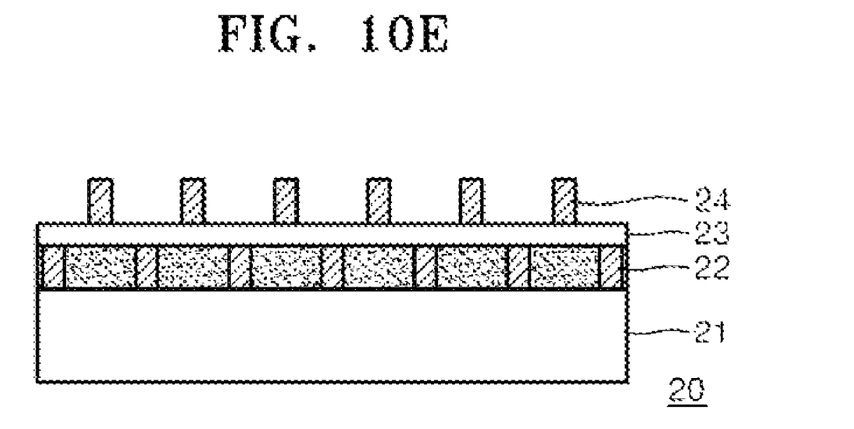

After that, as illustrated in FIG. 10B, a second grid pattern 33 arranged in parallel at a predetermined second period are transferred onto the second conductive metallic layer 32. The second conductive metallic layer 32 is etched using the grid pattern, or a plurality of grid patterns, 33 as a mask until the interlayer 23 is exposed, and then the remaining second grid pattern 33 is removed. Then, a plurality of second conductive metallic wires 24 is formed on the interlayer 23, as illustrated in FIG. 10C. Next, the interlayer 23 is separated from the release layer 35, as illustrated in FIG. 10D. The interlayer 23 is joined to the plurality of first conductive metallic wires 22, as illustrated in FIG. 10E, to complete the wire grid polarizer 20 having a double layer structure according to the current embodiment. In this case, the interlayer 23 must be joined to the plurality of first conductive metallic wires 22 so that the plurality of first conductive metallic wires 22 and the plurality of second conductive metallic wires 24 can be arranged alternately.

In the exemplary embodiment of FIGS. 10A through 10E, the interlayer 23 is separated from the release layer 35 and then joined to the plurality of first conductive metallic wires 22. However, the second substrate 34 may also be directly joined to the plurality of first conductive metallic wires 22 without the separation operation. In this case, the release layer 35 is not needed, and the second substrate 34 must be formed of a light transmitting material. In addition, the sum of the thicknesses of the second substrate 34 and the interlayer 23 must be optimum, as described above.

Figure 11:
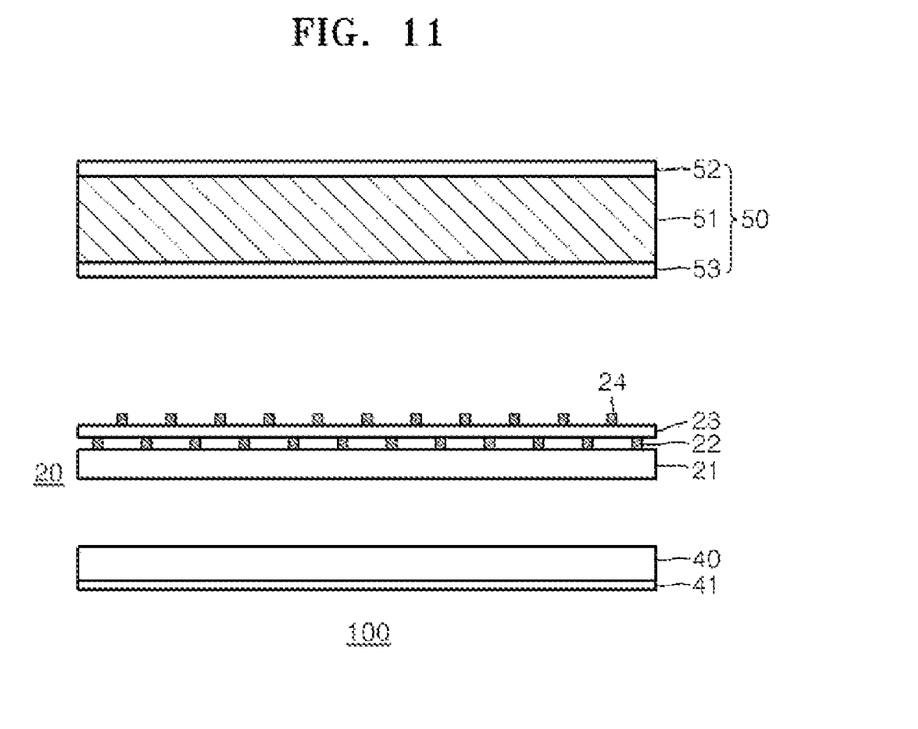
FIG. 11 shows a liquid crystal display (LCD) using a wire grid polarizer having a double layer structure according to an exemplary embodiment of the present invention.
Figure 12:
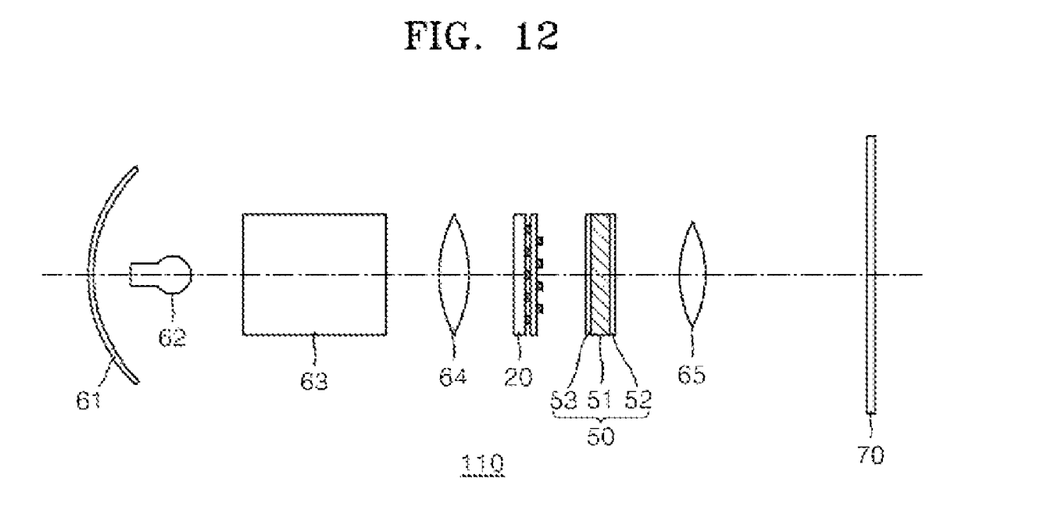
FIG. 12 shows a projector using a wire grid polarizer having a double layer structure according to an exemplary embodiment of the present invention.

As described above, the wire grid polarizer 20 having a double layer structure according to exemplary embodiments of the present invention can be more easily fabricated than that of the related art. Thus, a large-scale wire grid polarizer can be fabricated and applied to a variety of optical devices such as a liquid crystal display (LCD) and a projector. FIG. 11 shows a liquid crystal display (LCD) 100 using the wire grid polarizer 20 having a double layer structure according to an exemplary embodiment of the present invention, and FIG. 12 shows a projector 110 using the wire grid polarizer 20 having a double layer structure according to an exemplary embodiment of the present invention.

First, referring to FIG. 11, the LCD 100 comprises a backlight unit 40, a liquid crystal panel 50 for displaying an image, and a wire grid polarizer 20 having a double layer structure arranged between the backlight unit 40 and the liquid crystal panel 50. A reflection plate 41 is installed at a lower surface inside the backlight unit 40 so that light reflected by the wire grid polarizer 20 can be reused. The liquid crystal panel 50 includes a front polarizer 52 and a rear polarizer 53 surrounding a liquid crystal layer 51, as is well known.

When light emitted from the backlight unit 40 is incident onto the wire grid polarizer 20, for example, p-polarized incident light passes through the wire grid polarizer 20 and s-polarized incident light is reflected by the wire grid polarizer 20. Light transmitted by the wire grid polarizer 20 is incident onto the liquid crystal layer 51 through the rear polarizer 53 of the liquid crystal panel 50 and is used in forming an image. To this end, the rear polarizer 53 of the liquid crystal panel 50 and the wire grid polarizer 20 must have the same polarization direction. However, the wire grid polarizer 20, instead of the rear polarizer 53, may also be used as a rear polarizer of the liquid crystal panel 50.

Light reflected by the wire grid polarizer 20 is reflected by a reflection plate 41 of the backlight unit 40 and then is again incident onto the wire grid polarizer 20. Although not shown, a diffusion plate for making light distribution uniform is arranged on the backlight unit 40, so that s-polarized light is changed by the diffusion plate into unpolarized light. Thus, part of light reflected by the reflection plate 41 may pass through the wire grid polarizer 20. Since most of the light emitted from the backlight unit 40 can be reused in this way, the LCD 100 can have high brightness and reduced power consumption.

In addition, referring to FIG. 12, the projector 110 comprises a light source 62, an integrator 63 homogenizing light emitted from the light source 62, a collimating lens 64 collimating light from the integrator 63, a liquid crystal panel 50 forming an image by modulating light emitted from the light source 62, a wire grid polarizer 20 having a double layer structure positioned at the incident side of the liquid crystal panel 50, a projection optical system 65 projecting light from the liquid crystal panel 50 onto a screen 70, and a reflector 61 arranged at the rear of the light source 62 and reflecting light toward the liquid crystal panel 50. Although FIG. 12 shows that the wire grid polarizer 20 is located between the collimating lens 64 and the liquid crystal panel 50, the wire grid polarizer 20 may be located anywhere on the light path at the incident side of the liquid crystal panel 50. In addition, only one lens is illustrated in the projection optical system 65, but the projection optical system 65 may comprise a plurality of lenses. The liquid crystal panel 50 includes the front polarizer 52 and the rear polarizer 53 surrounding the liquid crystal layer 51, as described above.

Light emitted from the light source 62 is homogenized by the integrator 63 and collimated by the collimating lens 64. After that, for example, p-polarized light is transmitted and s-polarized light is reflected by the wire grid polarizer 20. The transmitted p-polarized light is modulated by the liquid crystal panel 50 to form an image and then projected by the projection optical system 65 onto the screen 70.

The reflected s-polarized light is reflected by the reflector 61 behind the light source 62 and is again incident on the wire grid polarizer 20 through the integrator 63 and the collimating lens 64. In this procedure, the s-polarized light is changed by the integrator 63 into unpolarized light. Thus, part of light reflected by the reflector 61 may pass through the wire grid polarizer 20. Since most of the light emitted from the light source 62 can be reused, the projector 110 can have high brightness and reduced power consumption.

According to exemplary embodiments of the present invention, conductive metallic wires of a wire grid polarizer are formed in a double layer, allowing the conductive metallic wires to have a period of about two times that of the related art. Thus, the wire grid polarizer according to the exemplary embodiments of present invention has the same performance as the conventional single-layer wire grid polarizer, and can be more easily fabricated than that of the related art.

While the present invention has been particularly shown and described with reference to exemplary embodiments thereof, it will be understood by those of ordinary skill in the art that various changes in form and detail may be made therein without departing from the spirit and scope of the present invention as defined by the following claims.

What is claimed is:

1. A wire grid polarizer having a double layer structure, comprising:
    a light transmitting substrate;
    a plurality of first conductive metallic wires arranged on the light transmitting substrate parallel to one another at a first predetermined period;
    a light transmitting interlayer arranged on the plurality of first conductive metallic wires; and
    a plurality of second conductive metallic wires arranged on the light transmitting interlayer parallel to one another at a second predetermined period,
    wherein the first conductive metallic wires of the plurality of first conductive metallic wires and the second conductive metallic wires of the plurality of second conductive metallic wires are arranged alternately.

2. The wire grid polarizer of claim 1, wherein a thickness d of the light transmitting interlayer satisfies:

$$nd=m\lambda/2,$$

where n is a refractive index of the light transmitting interlayer, $\lambda$ is a wavelength of incident light, and m is a natural number.

3. The wire grid polarizer of claim 1, wherein a fill factor for each of the pluralities of the first and the second conductive metallic wires is about 0.15 to 0.35.

4. The wire grid polarizer of claim 1, wherein a thickness of the light transmitting interlayer is about 150±50 nm, a period of each of the pluralities of the first and the second conductive metallic wires is about 200 nm, and a fill factor of each of the pluralities of the first and the second conductive metallic wires is about 0.25.

5. The wire grid polarizer of claim 1, wherein a light transmitting material is disposed between first conductive metallic wires of the plurality of first conductive metallic wires or between second conductive metallic wires of the plurality of second conductive metallic wires.

6. An (liquid crystal display) LCD comprising:
    a backlight unit including a reflection plate installed at a lower portion of the backlight unit;
    a liquid crystal panel which displays an image; and
    a wire grid polarizer including a double layer structure arranged between the backlight unit and the liquid crystal panel;
    wherein the wire grid polarizer including the double layer structure comprises:
    a light transmitting substrate;
    a plurality of first conductive metallic wires arranged on the light transmitting substrate parallel to one another at a first predetermined period;
    a light transmitting interlayer arranged on the plurality of first conductive metallic wires; and
    a plurality of second conductive metallic wires arranged on the light transmitting interlayer parallel to one another at a second predetermined period,
    wherein first conductive metallic wires of the plurality of first conductive metallic wires and second conductive metallic wires of the plurality of second conductive metallic wires are arranged alternately.

7. The LCD of claim 6, wherein a light transmitting material is disposed between the first conductive metallic wires of the plurality of first conductive metallic wires or between the second conductive metallic wires of the plurality of second conductive metallic wires.

8. The LCD of claim 6, wherein a thickness d of the light transmitting interlayer satisfies:

$$nd=m\lambda/2,$$

where n is a refractive index of the light transmitting interlayer, $\lambda$ is a wavelength of incident light, and m is a natural number.

9. The LCD of claim 6, wherein a fill factor for each of the pluralities of the first and the second conductive metallic wires is about 0.15 to 0.35.

10. The wire grid polarizer of claim 6, wherein a thickness of the light transmitting interlayer is about 150±50 nm, a period of each of the pluralities of the first and the second conductive metallic wires is about 200 nm, and a fill factor of each of the pluralities of the first and the second conductive metallic wires is about 0.25.

11. A projector comprising:
    a light source;
    a liquid crystal panel which modulates light from the light source; and
    a wire grid polarizer including a double layer structure arranged on a light incident side of the liquid crystal panel;
    a projection optical system which projects light from the liquid crystal panel; and
    a reflector, arranged at a rear of the light source, which reflects light toward the liquid crystal panel,
    wherein the wire grid polarizer including the double layer structure comprises:
    a light transmitting substrate;
    a plurality of first conductive metallic wires arranged on the light transmitting substrate parallel to one another at a first predetermined period;
    a light transmitting interlayer arranged on the plurality of first conductive metallic wires; and a plurality of second conductive metallic wires arranged on the light transmitting interlayer parallel to one another at a second predetermined period, wherein the first conductive metallic wires of the plurality of first conductive metallic wires and the second conductive metallic wires of the plurality of second conductive metallic wires are arranged alternately.

12. The projector of claim 11, wherein a light transmitting material is disposed between the first conductive metallic wires of the plurality of first conductive metallic wires or between the second conductive metallic wires of the plurality of second conductive metallic wires.

13. The projector of claim 11, wherein a thickness d of the light transmitting interlayer satisfies:

$$nd=m\lambda/2,$$

where n is a refractive index of the light transmitting interlayer, $\lambda$ is a wavelength of incident light, and m is a natural number.

14. The projector of claim 11, wherein a fill factor for each of the pluralities of the first and the second conductive metallic wires is about 0.15 to 0.35.

15. A method of fabricating a wire grid polarizer having a double layer structure, the method comprising:

forming a first conductive metallic layer on a light transmitting substrate;

forming a plurality of first conductive metallic wires parallel to one another at a first predetermined period by etching the first conductive metallic layer;

forming a light transmitting interlayer on the plurality of first conductive metallic wires;

forming a second conductive metallic layer on the light transmitting interlayer; and forming a plurality of second conductive metallic wires parallel to one another at a second predetermined period by etching the second conductive metallic layer, wherein first conductive metallic wires of the plurality of first conductive metallic wires and second conductive metallic wires of the plurality of second conductive metallic wires are arranged alternately.

16. The method of claim 15, further comprising, before the forming of the light transmitting interlayer, disposing a light transmitting material between the first conductive metallic wires of the plurality of first conductive metallic wires and planarizing the light transmitting material.

17. The method of claim 15, wherein the thickness d of a light transmitting interlayer satisfies:

$$nd=m\lambda/2,$$

where n is a refractive index of the light transmitting interlayer, $\lambda$ is a wavelength of incident light, and m is a natural number.

18. The method of claim 15, wherein the forming of the first conductive metallic wires of the plurality of first conductive metallic wires comprises:

transferring a grid pattern onto the first conductive metallic layer at a first predetermined period;

etching the first conductive metallic layer using the grid pattern as a mask until the light transmitting substrate is exposed; and removing the grid pattern.

19. The method of claim 15, wherein the forming of the second conductive metallic wires of the plurality of second conductive metallic wires comprises:

transferring a grid pattern arranged on the second conductive metallic layer at a second predetermined period;

etching the second conductive metallic layer using the grid pattern as a mask until the light transmitting substrate is exposed; and removing the grid pattern.

20. The method of claim 15, further comprising, after the forming of the second conductive metallic wires of the plurality of second conductive metallic wires, comprising disposing a light transmitting material between the second conductive metallic wires of the plurality of second conductive metallic wires and planarizing the light transmitting material.

21. The method of claim 15, wherein a fill factor for each of the pluralities of the first and the second conductive metallic wires is about 0.15 to 0.35.

22. A method of fabricating a wire grid polarizer having a double layer structure, the method comprising:

forming a first conductive metallic layer on a light transmitting substrate;

forming a plurality of first conductive metallic wires parallel to one another at a first predetermined period by etching the first conductive metallic layer;

forming a release layer of a hydrophobic material on the second substrate;

forming an interlayer of a light transmitting material on the release layer;

forming a second conductive metallic layer on the interlayer;

forming a plurality of second conductive metallic wires parallel to one another at a second predetermined period by etching the second conductive metallic layer; and separating the interlayer from the release layer and joining the interlayer to the plurality of first conductive metallic wires.

23. The method of claim 22, wherein the first conductive metallic wires of the plurality of first conductive metallic wires and the second conductive metallic wires of the plurality of second conductive metallic wires are arranged alternately.

24. The method of claim 22, wherein a thickness d of the interlayer satisfies:

$$nd=m\lambda/2,$$

where n is a refractive index of the interlayer, $\lambda$ is a wavelength of an incident light, and m is a natural number.

* * * * *